United States Patent [19]

Stuhlmuller et al.

[11] 3,919,891

[45] Nov. 18, 1975

[54] ELECTRICAL GEAR CHANGER FOR CHAIN DRIVEN VEHICLE

[76] Inventors: Brian J. Stuhlmuller, 740 Fairfield Road, Glenside, Pa. 19038; Paul Zakarian, 3302 Windsor Drive, Norristown, Pa. 19403

[22] Filed: Oct. 15, 1973

[21] Appl. No.: 406,690

[52] U.S. Cl. .......................... 74/217 B; 192/142 R
[51] Int. Cl.² ..................... F16H 9/00; F16D 11/04
[58] Field of Search ............ 74/217 B, 551.8, 551.1; 192/142 R

[56] References Cited
UNITED STATES PATENTS

| | | | |
|---|---|---|---|
| 2,168,322 | 8/1939 | Butler | 74/217 B |
| 2,690,083 | 9/1954 | Iseman | 74/217 B |
| 2,839,939 | 6/1958 | Juy | 74/217 B |
| 3,121,575 | 2/1964 | Bourgi | 74/217 B X |
| 3,732,787 | 5/1973 | Yamaguchi | 192/142 R |
| 3,742,777 | 7/1973 | Mathauser | 74/217 B X |
| 3,785,219 | 1/1974 | Anthamatten | 74/217 B |

*Primary Examiner*—Leonard H. Gerin
*Attorney, Agent, or Firm*—Rene A. Kuypers

[57] ABSTRACT

There is disclosed herein an electrical arrangement for changing gears in a chain driven vehicle having multiple coaxial chain driven sprockets of different diameters.

19 Claims, 5 Drawing Figures

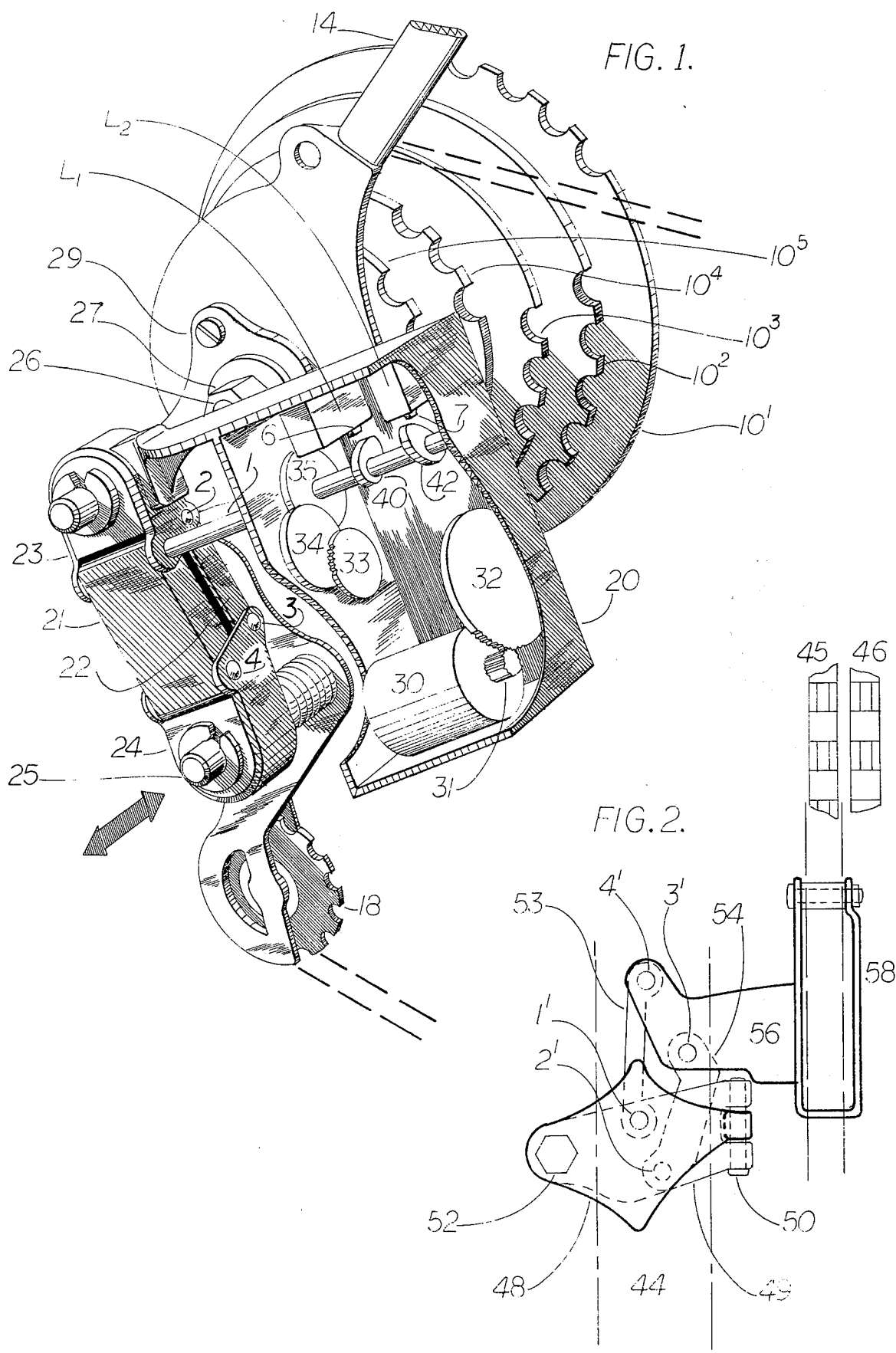

ELECTRICAL GEAR CHANGER FOR CHAIN DRIVEN VEHICLE

SUMMARY OF THE INVENTION

The instant invention relates to an electrically operated derailleur gear changer for a multi-speed chain driven vehicle. The means for initiating a change of gears is an electrical switch, which is located for convenient operation. Upon activation of the switch, the derailleur is operated by an axle which is driven by a motor driven gear box. Therefore, the instant example derailleur is operated by a direct drive in either direction. The motor's operation is controlled by an angular velocity and rotational direction detector which assures that the motor does not operate unless the sprocket and the chain have attained proper velocity and direction.

The invention also provides for use of a front and rear derailleur system, each of which may be selectively engaged.

Cycle gear changes up to the present time have utilized the well known mechanically operated derailleur gear changer, which is activated through a shift lever device attached to the derailleur by means of a cable and operating against spring tension. This prior art operation provides numerous shortcomings, chief of which are difficulty of operation, lack of safety, failure of positive shifting between gears, and unreliable operation.

The prior art mechanical derailleur shifting technique is deemed inconvenient in view of the location of the shift lever which is conventionally located on the horizontal leg bar, for example, on a multi-speed racing bicycle for men. Accordingly, the rider of such a vehicle must remove one hand from the handle bar for placement on the shift lever in order to change gears. This must also be accomplished while the rider is in a hunched position. This prior art arrangement is not only inconvenient, but is recognized as being unsafe to all but the very skilled rider.

Thus, when a cyclist is pedaling and desires a gear change, he must adopt an unbalanced position to simultaneously apply pressure to the shift lever in order to move the derailleur, and keep a firm grip on the handle bar in order to keep the vehicle on course. In view of the speed of the vehicle, the posture of the operator, and the removal of one hand from the handle bar, an unsafe condition ensues.

Another recognized shortcoming of the prior art gear changer has been the tendency of the chain to jump or skip over several sprockets during the shifting operation. In other words, when there is a need to change from a lower to a higher gear ratio or vice versa, the change does not always occur in an orderly progression. This is an undesirable aspect of the prior art because the cyclist normally selects a sprocket by correct feel and therefore, when there is sprocket skipping, the operator has to labor to find the correct gear or sprocket.

The object of this invention is to remedy the above stated drawbacks. Therefore, it is the purpose of this invention to employ a new type of motor operated derailleur which provides direct drive in either direction and without the need for the shift lever, cable, and tension mechanisms of the prior art. Accordingly, the present invention utilizes a derailleur which can be readily activated for gear changing purposes by an electrical actuator which may be conveniently located on the handle bars whereby the operator can easily activate the switch.

BRIEF DESCRIPTION OF THE DRAWINGS

FIG. 1 illustrates a perspective view of a cycle rear derailleur gear changer, used in this invention in conjunction with an electrical-mechanical gear box for a chain driven vehicle.

FIG. 2 depicts a top view of a front derailleur gear changer as used in this invention.

DESCRIPTION OF THE PREFERRED EMBODIMENT

Figure 3:
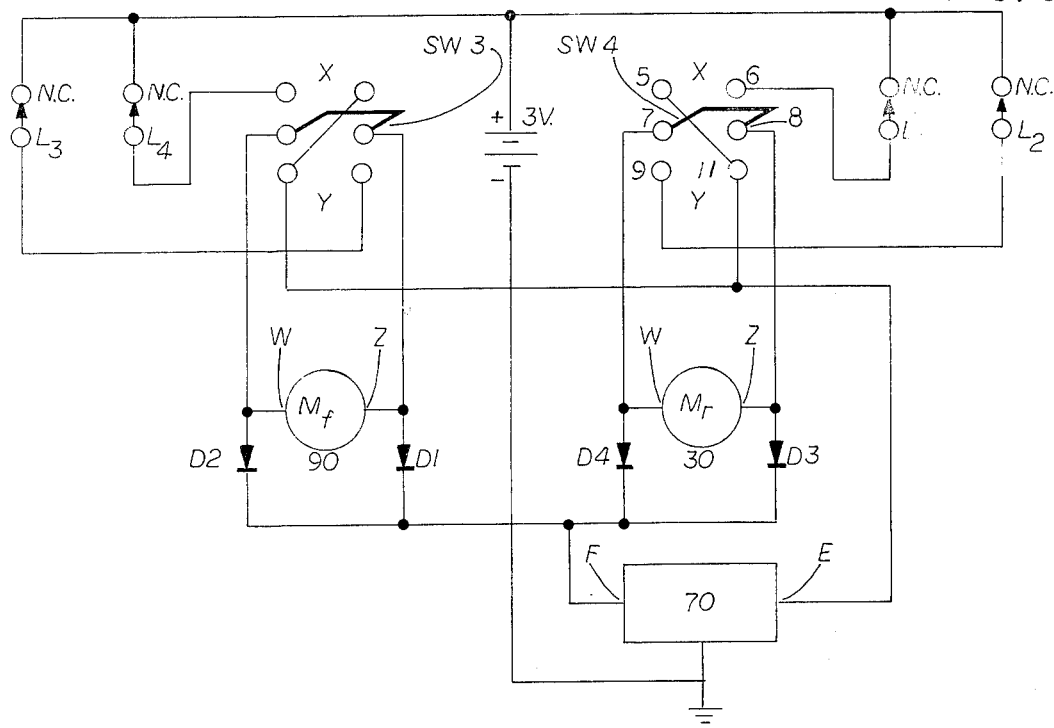
FIG. 3 shows the overall circuit schematic employed with the derailleur assemblies shown in FIGS. 1 and 2.

Referring now to FIG. 1, there is depicted in general a chain-and-sprocket drive assembly. The change-gear control device depicted is a type well known to the prior art, consisting of a coaxial sprocket group often having a plurality of individual sprockets $10^1$, $10^2$, $10^3$, $10^4$, and $10^5$. Several teeth of the sprockets are shown by way of example. The sprocket group 10 may represent the five rear sprockets, for example, of a tenspeed chain driven bicycle. The chain (not shown) is in engagement with the sprocket $10^3$ as illustrated by way of a dotted line representing the chain path. The chain also engages a set of idler wheels 18 and a second wheel which is not shown. These idler wheels provide constant chain tension and guidance for movement between sprockets. The sprockets group 10 is shown in FIG. 1 as being connected to the frame 14 by an axle/-nut assembly, 26 and 27 respectively.

The derailleur gear changer assembly is connected to the frame 14 by means of the same axle/nut assembly 26, 27 passing through a mounting bracket 29 and is used to transfer the chain from one sprocket to another while pedaling. The derailleur in the well known manner basically comprises two movable arms 21 and 22 which are maintained in a parallel orientation by two derailleur frame members 23 and 24. The members 23 and 24 are attached to the arms 21 and 22 by the pins 2, 3 and 4 and the axle 1. The axle 1 pivots in the derailleur frame 23 so as to drive arm 21 to which it is permanently attached by suitable means. The parallel arms 21, 22 and the frames 23, 24 together comprise a distortable parallelogram. The parallelogram operates to translate its lower end and the pin 25 in the directions shown by the arrow. This action is accomplished in the following manner.

The axle 1 is coupled into a gear reduction box 20, (shown cut away) comprising the gears 31, 32, 33, 34, and 35. The gear 31 is connected to the end of a shaft of a low voltage D.C. motor 30. The gear 35 is connected to the axle 1 so that the latter may be made to rotate upon energization of the motor 30. Also connected to the axle 1 are the cams 40 and 42 which operate in conjunction with the limit switches $L_1$ and $L_2$. This aspect of the invention will be discussed in greater detail hereinafter.

In operation, the energizing of the D.C. motor causes the axle 1 to rotate in either the clockwise or counter-clockwise direction. A clockwise rotation of the axle 1 causes the parallelogram to distort such that the pin 25 moves outwardly to the drawing such that the idler 18, which is integral with the parallelogram also moves outwardly. This action of the idler 18 causes the chain to be shifted downwardly from gear $10^3$ to $10^4$. In a similar manner, a counterclockwise rotation of the axle 1 causes the pin 25 to move inwardly so that there can be an upshift, for example, from gear $10^3$ to gear $10^2$.

Referring now to FIG. 2, there is depicted the top view of a front derailleur gear changer usually utilized with the two main pedal sprockets 45 and 46 for a ten-speed bicycle. For purposes of simplicity, several sections only of the sprockets 45, 46 are shown and the dotted chain path is shown engaged with the sprocket 45. The derailleur is shown attached to the bicycle frame 44 (shown in dotted lines) by means of the upper mounting clamp 48 and the lower mounting clamp 49. Both clamps 48 and 49 are joined at one end by the clamp hinge 50 and are connected to one another by the clamp nut 52.

The front derailleur (FIG. 2) in a manner similar to the previously described rear derailleur discussed with respect to FIG. 1, provides two pivot arms 53, 54. The arms 53, 54 comprise a distortable parallelogram about the four pivots $1^1$, $2^1$, $3^1$, and $4^1$. The pivot $1^1$ incorporates a rotatable axle which is coupled into a reduction gear box and motor in the same manner as previously described with respect to the rear derailleur.

In operation, the clockwise rotation of the axle 1 through the drive pivot point $1^1$ causes the distortable parallelogram to become distorted so that the extension 56 is translated rightwardly causing the chain guide 58 to similarly so move. The rightward translation of the chain guide 58 causes the chain along the designated chain path to be moved from sprocket 45 to 46. In like manner, a counterclockwise rotation of the axle through the drive pivot causes the leftward translation of the extension 56 to enable the chain to move from sprocket 46 to sprocket 45.

Accordingly, from the above description it can be appreciated that the front and rear derailleur of this invention provide for translation in either one of two directions by means of a direct drive axle arrangement. The manner of controlling the motor and axle rotation for the derailleur gear changing will be discussed in detail below.

FIG. 3 illustrates the electrical circuit utilized with the front and rear derailleurs discussed with respect to FIGS. 1 and 2. The circuit controls the operation of the gear box motors which in turn control the functioning of the axle driven derailleurs. The circuit schematic shows normally closed switches $L_1$ and $L_2$. These are the axle limit switches which are positioned within the gear box 20. The switches $L_1$ and $L_2$ are activated by the cams 40, 42 (see FIG. 1). In like manner, although not shown, the normally closed switches $L_3$ and $L_4$ are contained within the reduction gear box used with the front derailleur assembly. The purpose of the limit switches is to control the amount of travel of the gear box motors. As will be seen, the opening of these limit switches will disconnect electrical power from the motors and thus stop the motion of the motor.

The double-pole, double-throw switch SW3 is a center-off, momentary control switch which controls the operation of the front derailleur shown in FIG. 2. The switch SW3 is a relatively small device which may be conveniently located on the handle bar of a bicycle for easy activation by the thumb or a finger, but without the hand leaving the handle bar grip. The double-pole, double-throw switch SW4, which controls the operation of the rear derailleur shown in FIG. 1, is similarly located near the handle bar grip of the other hand for facile operation and for manipulation without losing control due to removal of the hand from the handle bar.

A detector circuit 70 is provided to assure that the gear box motors 30 and 90 do not operate unless the pedal sprockets 45 and 46 and chain have attained proper velocity and direction since if proper velocity has not been attained excess torque would be required by the motor, thereby causing it to be damaged. This circuit also provides an improvement over the prior art. Normally if the chain is driven in reverse direction during shifting, the chain has a tendency to tangle between sprockets due to a lack of proper chain tension. This causes a severe jam and occasionally chain breakage. Because this circuit 70 allows shifting only during a forward motion of the main pedal sprocket 45, 46, this problem of the prior art is eliminated. This circuit will be discussed in greater detail in later paragraphs.

A battery is also included in the circuit of FIG. 3 to provide power to the motor and to a control circuit within the detector 70. In the preferred embodiment, the battery has a value of 3 volts and may be conveniently located on the frame under the seat for ready access and replacement. The 3 volt D.C. supply has been selected as a power source in view of its economy and common usage.

In the quiescent state, SW3 and SW4, the handle bar switches, are in the center-off position. Let us therefore assume a situation where the rear derailleur is to be activated and neither limit switch $L_1$ or $L_2$ is opened and further assume that angular velocity and rotational direction detector 70 is activated. Terminal E becomes a low impedance point and allows the motor circuit to be completed. The direction of the current through the motor, it will be seen, is controlled by the particular actuation (either position X or Y) of the switches SW3 or SW4.

Assume therefore that switch SW4 has been activated in direction X. Current therefore flows from the positive terminal of the battery through limit switch $L_1$, terminals 6 to 8 of SW4, to terminal Z of motor 30. Current then proceeds out of terminal W through the switch SW4 via terminals 7–5–11 and thence to terminal E. Terminal E terminates at ground potential when the detector 70 is active or operative. The circuit is completed by the connection of the negative side of the 3 volt battery to ground at the detector 70. This current through motor 30 (i.e., $M_r$ in FIG. 3) will cause the axle 1 to rotate and the derailleur (FIG. 1) to change gears. The length of time that the switch SW4 is held in the X position will determine the amount of axle rotation and the number of gears that are changed.

In the event that the bicyclist operator operates the switch SW4 in the Y direction, current will flow through the motor 30 in the direction from W to Z. This, of course, reverses the shaft rotation from that previously described. When switch SW4 is in the Y position, current flows from the positive terminal of the battery through switch $L_2$ to terminals 9 and 7 and thence from terminal W to Z of the motor 30. Current then travels to terminal 8–11 of switch SW4 and thence to terminal E of detector 70. The circuit is completed through the negative terminal of the battery at the detector.

The amount of rotation of the axle 1 is controlled by the limit switches $L_1$, $L_2$. If the axle rotation were to exceed a determined number of degrees, the derailleur would cause the chain to fall off the sprocket thereby causing possible damage. The limit switches $L_1$ and $L_2$ together with the cams 40, 42 limit rotation of axle 1 in either the clockwise or counterclockwise direction. The cams 40 and 42 cause the respective switches $L_1$ and $L_2$ to open at appropriate times by engaging the buttons 6 and 7 and causing them to depress. In the embodiment shown, at any one time both switches $L_1$ and $L_2$ may be closed or either may be closed, but both may not be open at the same time. In other words, when switch $L_1$ is opened, it indicates that the chain cannot be moved further in one direction without being removed from the sprocket and accordingly, any further actuation of the control switch SW4 in the X direction will be to no avail.

It should be noted that irrespective of the X or Y position of the control switch SW4, battery power from the 3 volt battery is also directed into the detector 70. Therefore, when the switch SW4 is in the X direction, the battery potential is supplied to terminal F of the detector 70 via diode D3; and when in the Y direction, it is supplied through diode D4. As will be shown later, the detector 70 is self powered and normally would activate when the minimum velocity and rotational direction is fulfilled; however, the detector is forced to be inactive until SW3 or SW4 is activated and power is supplied to terminal F.

The above description relates to the operation of the rear derailleur shown in FIG. 1. The circuit operation of the front derailleur of FIG. 2 operates in identical manner to that described except that the operator utilizes control switch SW3.

Figure 4:
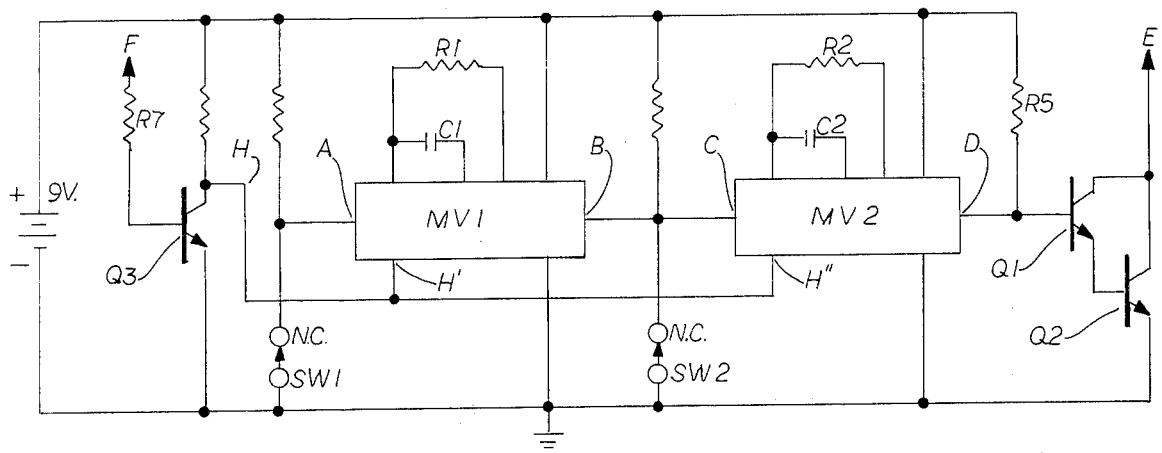
FIG. 4 is a detailed schematic of the angular velocity and rotational direction detector of FIG. 3.

Referring now to FIG. 4, there is shown the circuit schematic for the angular velocity and rotational direction detector 70 (see FIG. 3). The circuit consists basically of two monostable multivibrators MV1, MV2, which are sometimes referred to as single shots or one shots. Multivibrators MV1, MV2 can both be of the retriggerable type or one can be retriggerable and one non-retriggerable. As is understood in the art, a monostable multivibrator has the property of producing an output pulse when its input is activated. The duration of the output pulse is independent of the input signal and is generally determined by timing components such as a resistor and capacitor or an inductor and resistor.

After the input of the non-retriggerable multivibrator has been triggered by a signal, its output will always return to its quiescent state and can be retriggered only after a certain minimum time after the output has returned to its quiescent state. The output of the retriggerable type continues to remain in its triggered state as long as the period of the input pulses are shorter than the output pulse duration, and the timing circuit becomes re-energized with each input signal. In the preferred embodiment, multivibrator MV1 is a non-retriggerable type and MV2 is a retriggerable type.

The multivibrators MV1 and MV2 are composed of integrated circuit chips in view of size, cost, noise immunity and current consumption. The type used is identified as FET (field effect transistor) CD 4047 made by RCA. The circuit of FIG. 4 utilizes a +9 volt power supply which is obtained from an independent source.

Switches SW1 and SW2 are normally closed switches which are located near the main pedal sprocket. Switches SW1 and SW2 are placed near the pedal sprocket so that its rotation will alternately activate each switch. The physical separation between the switches SW1, SW2 is one of the two parameters which determine the minimum velocity which the sprocket must attain. The other parameter which determines the minimum velocity is the timing duration of the output of multivibrator MV1. This will be discussed in greater detail hereinafter. The switches SW1, SW2 are activated by mechanical techniques in the instant embodiment, however other techniques using magnetic expedients also may be used without departing from the spirit of this invention.

The detector circuit 70 terminates in a Darlington type circuit comprising transistors Q1, Q2. It should also be noted that terminal E (see FIG. 3) is in the collector circuit of the Darlington pair. Terminal F (see FIG. 3) is located at the resistor R7 connected to the base element of transistor Q3 (see FIG. 4).

Figure 5:
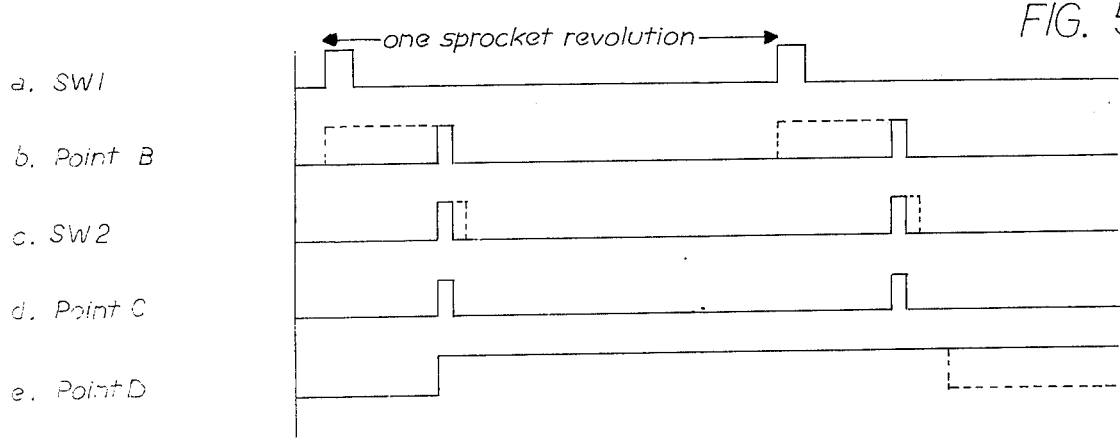
FIG. 5 is a timing diagram showing the sequence of events of FIG. 4.

A positive potential which is initiated by switch SW3 or SW4 (see FIG. 3) is applied to terminal F. Let us assume that switches SW1 and SW2 are initially closed so that point A is at ground potential. When SW1 is activated by the pedalling action of the cyclist, switch SW1 opens and point A goes to 9 volts positive. This positive pulse is shown in FIG. 5a.

The 9 volt signal applied to terminal A of multivitrator MV1 starts its timing circuit. Point B would rise to a value of +9 volts for a duration determined by R1C1 but it cannot do so as long as switch SW2 is closed. This is indicated by the dotted line (FIG. 5b) output pulse and accordingly the output stays low (indicated by the solid line). When switch SW2 is activated (FIG. 5c) or opened for the period shown, it allows point B to go to +9 volts indicated by the solid pulse shown in FIG. 5b. Therefore point C (FIG. 5d) goes 9 volts positive for the for the period determined by the time period that the signals of FIG. 5b and 5c are simultaneously positive. Points B, B1 and C are electrically the same point and provide the input to multivibrator MV2. When point C goes to +9 volts, multivibrator MV2 begins its timing operation as determined by R2C2 and as shown in FIG. 5e. The output of multivibrator MV2 is terminal D (FIG. 5d). In reality, point B (the output of MV1) and switch SW2 perform a logical AND function. in other words, point B and switch SW2 must be activated at the same time in order to produce an input pulse at terminal C which initiates multivibrator MV2.

Hence the timing of multivibrator MV1 (i.e., Point B) must not be over before switch SW2 is activated. Therefore, the pulse duration of MV1 and the time between the pulses SW1 and SW2 set the minimum velocity of the sprocket. Also, the sequence of switches SW1 and SW2 must be in that order.

The output of point D is applied to the base terminal of transistors Q1 and Q2 but is unable to turn on this Darlington pair in view of the very limited output source current supplied by the CD 4047 circuit chip. The current source is thereby provided by +9 volts through resistor R5. Transistor Q2 therefore provides a low impedance circuit and terminal E completes its circuit to ground potential. It should be noted that the pulse duration of MV2 (FIG. 5e) must be long enough such that at the minimum velocity of the sprocket, switches SW1 and SW2 are actuated before the pulse from MV2 is over. This assures the retriggering of MV2 and terminal E will remain at a low impedance point and the motors 30, 90 will operate when the control switches SW3, SW4 (FIG. 3) are activated.

It should be noted hereat that the proper sequence of switch activation must be in the order SW1 and SW2 and not vice versa. This proper rotation is necessary to determine proper rotational direction, since if the chain is driven in the wrong direction, the chain will become tangled in the rear shifting sprockets thus disengaging and possibly causing damage. In operation the sequence of operation cannot be SW2, SW1 since if the switch SW2 is activated first, no signal is produced at input C to initiate the timing of MV2. The reason for this is that when MV1 is not activated first, the output of B is at ground so that the opening of switch SW2 has no effect in producing a pulse at terminal C. In other words, by the time SW1 is activated to initiate MV1, the activation of SW2 is over and the simultaneous occurrence of pulses shown in FIGS. 5b and 5c will not result. Consequently, there is no output at terminal D and the motors 30, 90 cannot be energized.

An additional feature of the invention resides in the fact that the timing circuit does not operate until it is desired to operate the motors 30, 90. The option is obtained by utilizing the reset or clear terminals $H^1$ and $H^{11}$ of multivibrator MV1, MV2, respectively. Thus, if terminals $H^1$, $H^{11}$ have +9 volts applied thereto, then irrespective of the operation of SW1 and SW2, MV1 and MV2 will not operate. Now +9 volts will be applied to terminals $H^1$ and $H^{11}$ until transistor Q3 turns on. Base current for transistor Q3 is provided through resistor R7 and when energy is applied to the motors 30, 90.

As transistor Q3 is turned on, its collector H goes to nearly ground potential thereby causing $H^1$ and $H^{11}$ to similarly go to nearly ground. This enables multivibrator MV1, MV2 to operate and become ready to receive signals from SW1 and SW2.

In another embodiment a centrifugal switch is substituted for the angular velocity detector 70 and is attached to the sprocket 45 and 46 (FIG. 2). In this substitution, one side of the switch is connected to terminal E and the other side is connected to ground in the circuit of FIG. 3. In essence the centrifugal switch is a single-pole, single throw switch and is normally in the open position.

In operation, the centrifugal switch closes upon the sprocket reaching a predetermined speed of rotation. Accordingly, the motor circuits are completed to the 3 volt battery supply allowing the gear ratio to be changed in the manner previously described.

The embodiments previously discussed are based on a detection scheme of the angular velocity and direction. Those skilled in the art will recognize however that the linear velocity and direction of the chain (not shown) may also be sensed and utilized in the detector circuitry 70 of FIG. 3 without departing from the spirit of this invention.

Another embodiment of this invention eliminates the gear box assembly 20 of FIG. 1. In this embodiment, one end of a telescoping trilateral enclosure is attached to the frame 14 by means of a suitable bracket. The other end of the enclosure is attached rigidly to the pin 25 (FIG. 1).

A motor driven screw is positioned internally the enclosure. The activation of the motor driven screw causes the expansion or contraction of the enclosure co-axial with that of the pin 25 depending upon the polarity of the signal applied to the motor. Accordingly in operation, the energizing of the motor and the accompanying expansion or contraction of the enclosure causes the inward and outward motion of the pin 25. As is understood, this inward and outward movement of the pin 25 enables the derailleur to alter the gear ratio in a well known manner.

Another embodiment of the invention substitutes a unidirectional voltage generator for the 3 volt battery supply and the angular velocity detector 70 shown in FIG. 3. The voltage output of a generator depends in part upon the rotational speed of the generator armature. By driving the generator from the main sprocket 46, the voltage output of the generator will depend upon the angular velocity of the sprocket. The power required to activate the motors 30 and 90 follows the same path as prescribed in FIG. 3 except that the generator has replaced circuit 70 and the 3 volt battery. The motors 30 and 90 will not be driven until the generator creates a predetermined minimum voltage.

We claim:

1. The method of changing the gear ratio in a velocipede utilizing an electrically driven gear changer comprising the step of
   a. energizing said electrically driven gear changer to cause the gear ratio to be changed.

2. The method of actuating a derailleur type of gear changer for a multi-sprocketed chain driven velocipede having an axle member through at least one of its pivot points comprising the steps of
   a. rotating at least one said axle member to cause said derailleur to be distorted, and whereby said gear ratio is changed.

3. The method in accordance with claim 2 wherein a motor driven gear reduction box is coupled to said axle including the further step of
   a. energizing said motor to cause said derailleur to change gears via said gear reduction box and axle.

4. The method in accordance with claim 3 including a switching means and providing the step of
   a. applying a first polarity signal to said motor to cause said derailleur to up-shift said gear ratio.
   b. applying a second polarity signal to said motor to cause said derailleur to down-shift said gear ratio.

5. The method in accordance with claim 2 and including the step of
   a. limiting the rotation of said axle member in both the clockwise or counterclockwise direction.

6. A derailleur device for use in a chain operated co-axial multi-sprocket mechanism consisting of first and second arms which are coupled to end members and which are joined to one another by pivot means which are four in number to form a parallelogram comprising
   a. axle means positioned through at least one of said four pivot means, whereby said parallelogram may be distorted by a rotation of said axle to cause a shifting between said coaxial sprockets.

7. A derailleur in accordance with claim 6 and further comprising
   a. a reduction gearing assembly which is coupled to said axle means, and
   b. motor means connected to said reduction gearing assembly
   whereby the activating of said motor means causes said axle to rotate via said reduction gearing.

8. A process for changing the ratio of a gear changer utilized in a single chain driven, multi-speed velocipede comprising the step of,
   a. displacing a moveable idler with an electrical means which causes the gearing of said single chain drive velocipede to be upshifted or downshifted.

9. The process in accordance with claim 8 and further including the step of
a. displacing a movable chain guide with an electrical means which causes the gearing of said single chain driven velocipede to be upshifted or downshifted.

10. The method of changing the gear ratio in a single chain velocipede utilizing an electrically driven gear changer comprising the step of
a. energizing said electrically driven gear changer to cause the gear ratio of said single chain velocipede to be increased or alternatively decreased.

11. The method of changing the gear ratio in a velocipede in accordance with claim 10 wherein
a. a first polarity signal applied to said gear changer causes an up-shifting of said gear ratio, and
b. a second polarity signal applied to said gear changer causes a down-shifting of said gear ratio.

12. The method of changing gears in accordance with claim 10 wherein said single chain driven velocipede is driven by a sprocket and including the step of
a. detecting the angular velocity of said sprocket whereby when a predetermined sprocket velocity is reached, the energizing of said electrically driven gear changer causes said gear ratio to change, and whereby when said predetermined sprocket velocity is not reached, the energizing of said electrically driven gear changer prohibits the changing of said gear ratio.

13. The method of changing gears in accordance with claim 12 and including the step of
a. detecting the rotational direction of said sprocket, whereby when the sprocket is driven in the reverse direction, the electrically driven gear changer cannot be energized.

14. The method of changing gears in accordance with claim 11 and including an electrical switching means and including the steps of
a. actuating said switching means in a first direction to cause said gear changer to up-shift said gear ratio, and
b. actuating said switching means in a second direction to cause said gear changer to down-shift said gear ratio.

15. An arrangement for altering the gear ratio of the drive wheels of a single chain driven velocipede comprising
a. a gear changing means connected to the drive means of said single chain driven velocipede,
b. means coupled to said gear changing means for causing said gear changing means to be activated, whereby the gear ratio of the single chain velocipede is increased or alternatively decreased.

16. The gear changing arrangement in accordance with claim 15 wherein said electrical means includes
a. a motor,
whereby when said motor is energized by a first polarity signal, said gear changing means causes an up-shifting of said gear ratio, and whereby when said motor is energized by a second polarity signal, said gear changing means causes a down-shifting of said gear ratio.

17. The gear changing arrangement in accordance with claim 16 wherein said electrical means further includes
a. switching means for activating said motor device, whereby when said switching means is activated in a first direction, said gear ratio is upshifted, and whereby when said switching means is activated in a second direction, said gear ratio is downshifted.

18. The arrangement in accordance with claim 15 wherein said gear changing means comprises
a. a derailleur mechanism which is coupled thereto.

19. The gear changing arrangement in accordance with claim 15 wherein said single chain driven velocipede is driven by sprocket means and wherein said electrical means includes
a. means for determining the angular velocity and direction of said sprocket means,
whereby said gear ratio may be altered when said angular velocity has reached a predetermined value and said angular direction propels said velocipede in the forward direction.

* * * * *